United States Patent Office 3,186,956
Patented June 1, 1965

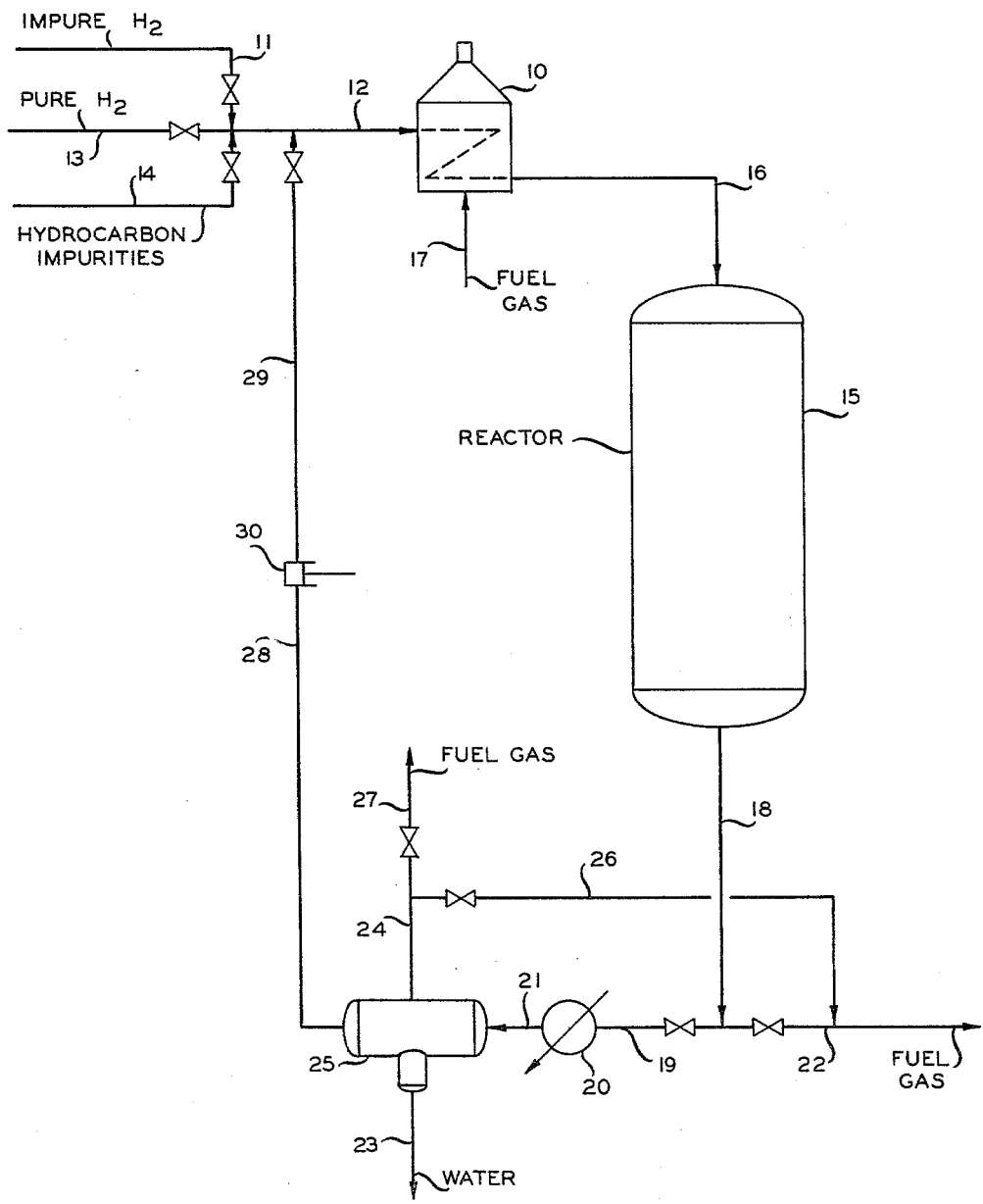

3,186,956
ACTIVATION OF A NICKEL-KIESELGUHR CATALYST
John T. Cabbage, Bartlesville, Okla., assignor to Phillips Petroleum Company, a corporation of Delaware
Filed May 25, 1961, Ser. No. 112,591
2 Claims. (Cl. 252—459)

This invention relates broadly to the activation of metal hydrogenation catalysts. In accordance with one aspect, this invention relates to an improved method of activating or reducing metal hydrogenation catalysts, especially nickel-kieselguhr hydrogenation catalysts. In accordance with another aspect, this invention relates to the metal hydrogenation catalysts activated by the above process and to the hydrogenation of hydrocarbons, especially aromatic hydrocarbons, in contact with said catalysts.

In the hydrogenation of unsaturated compounds, and particularly in the hydrogenation of aromatic hydrocarbons, for example benzene, metal catalysts are used. These metal catalysts are usually received from the manufacturer as metal oxide or other compound on a support such as kieselguhr. The metal oxide or other compound must be reduced, at least in part, to the metal before it is active for hydrogenation. Normally, this reduction step is accomplished with the catalyst in place in the hydrogenation reactor, but before the reactor is placed onstream for hydrogenation. This reduction step has been ordinarily carried out in the prior art by employing pure hydrogen as the reducing medium. However, pure hydrogen is extremely expensive to use. Also, in some plant practices, steam is added to impure hydrogen as a diluent to control the temperature rise during reduction of the catalyst. However, this has also been found to be undesirable since the catalyst life is somewhat less when employing steam as a diluent compared with a catalyst reduced with commercial pure cylinder hydrogen.

According to the invention, I have found that various metal hydrogenation catalysts, particularly nickel hydrogenation catalysts, can be effectively and efficiently activated or reduced prior to use without the prior art disadvantages by using an impure hydrogen stream as the reducing medium or atmosphere.

Accordingly, an object of this invention is to provide an improved method for activating hydrogenation catalysts.

Another object of this invention is to provide an improved method for activating or reducing nickel-kieselguhr hydrogenation catalysts.

A further object of this invention is to provide a novel reducing medium or atmosphere for activating metal catalysts.

Another object of this invention is to provide an active metal hydrogenation catalyst, especially a nickel hydrogenation catalyst, of increased catalyst life.

Other objects, aspects as well as the several advantages of this invention will be apparent to one skilled in the art upon reading this disclosure and the appended claims.

Broadly, according to the invention, I provide an improved process for activating or reducing metal hydrogenation catalysts, such as nickel-kieselguhr hydrogenation catalysts, which comprises contacting the catalyst at a temperature ranging from about 500 to 750° F. with a reducing atmosphere or medium comprising an impure hydrogen stream containing a minor proportion of at least one hydrocarbon material demethylizable at the temperature of contacting. Many of the prior art disadvantages are obviated when activating or reducing metal hydrogenation catalysts according to the invention.

According to one embodiment of the invention, an impure hydrogen stream containing a minor proportion of paraffinic hydrocarbons having from 2 to about 6 carbon atoms obtained as an off-gas from a reformer operation is utilized as the reducing atmosphere or medium. In carrying out the invention according to this embodiment, the reduction step can be conducted without the addition of steam which is normally used by the prior art methods.

In accordance with another embodiment of the invention, a residue gas obtained from the cracking of light hydrocarbons comprised principally of hydrogen and containing a small amount of olefinic hydrocarbons is utilized as the reducing atmosphere. By operating according to this embodiment, the activation or reducing step can be carried out on a once-through basis without any added steam.

According to a further embodiment of the invention, I prepare an impure hydrogen stream for reducing metal hydrogenation catalysts prior to use by adding a controlled amount of at least one demethylizable hydrocarbon material to a pure hydrogen stream (cylinder hydrogen) and then pass this mixture over the catalyst bed to activate same. By carrying out the invention according to this embodiment, the addition of steam diluent is not required and the reducing gas can be passed over the catalyst on a once-through basis. In addition, if equipment is available, recycle can be effected.

The impure hydrogen streams that I prefer to utilize as the reducing medium for activating metal hydrogenation catalysts according to the invention are ordinarily obtained as a hydrogen-rich residue gas stream recovered from a hydrocarbon conversion process. Ordinarily, such hydrogen-rich streams contain a limited amount of at least one demethylizable hydrocarbon impurity such acyclic hydrocarbons having from 2 to about 6 carbon atoms, particularly paraffins and olefins. For example, hydrogen-rich off-gas streams obtained from reformer operations ordinarily contain light paraffinic hydrocarbons, whereas residue gases obtained from light hydrocarbon cracking operations contain demethylizable olefinic hydrocarbons. Any impure hydrogen stream containing demethylizable hydrocarbon materials that are demethylizable at temperatures ranging from about 500 to about 750° F. can be employed according to the invention.

The impure hydrogen streams that I utilize as the reducing medium will contain up to about 12 mol percent demethylizable hydrocarbons, normally 4 to 8 mol percent. When the demethylizable impurities are below about 2 mol percent (based on ethane realizing that propane, butane, pentane, and hexane, respectively, have about 2, 3, 4, and 5 times the heat produced by demethylization as compared to ethane), it is not necessary to dilute the reactivation process by recycle of the methane-hydrogen produced in the reactivation step. When, however, the demethylizable components are present in the hydrogen source above about 2 mol percent (based on ethane as stated above), recycle is required. This can be accomplished by recycling a portion of the reactor effluent (hydrogen and methane only) and bleeding off the remaining portion to allow fresh hydrogen to be brought into the system. This then allows control of concentration of demethylizable material in the reactor charge (or hydrogen concentration) and bed heating rates. When the demethylizable impurities are above about 2 mol percent, an inert gas, e.g. nitrogen, methane,, etc. can be utilized to dilute the reducing medium as a substitute for recycle operation.

In actual operation, when an impure hydrogen stream containing demethylizable hydrocarbon material(s) contacts the metal hydrogenation catalysts to be reduced at temperatures above about 500° F., rapid demethylation of the $C_2$ and heavier hydrocarbons in the hydrogen stream occurs. The demethylation reaction is highly exothermic. Thus, according to the invention, the heat of demethylation of the hydrocarbons present in the hydrogen stream is used along with the heat in the circulating stream to bring the catalyst bed to the desired reduction temperature. As indicated above, the quantity of demethylizable material employed in the hydrogen stream can be regulated to control the rate of heating of the catalyst bed.

Catalysts that can be activated or reduced with impure hydrogen according to the invention can be any of the well-known metal hydrogenation catalysts, either supported or unsupported. However, nickel-kieselguhr catalysts are preferred since they are quite active for the hydrogenation of aromatic hydrocarbons, especially benzene. Other active hydrogenation catalysts that can be reduced according to the invention include Raney nickel, copper chromite, finely divided platinum, finely divided palladium, chromium oxide, and the like.

The catalysts that can be activated according to the invention are well known and methods for their preparation are also well known. The nickel-kieselguhr catalysts, which are preferred for the hydrogenation of benzene, can be prepared by saturating kieselguhr with a reducible metal compound such as nickel hydroxide after which at least a portion of the nickel compound in the mixture is reduced to elemental nickel by contacting same with a stream of impure hydrogen according to the invention. As indicated above, the activation temperature ranges from about 500 to about 750° F. or higher for these catalysts. The nickel-kieselguhr catalysts activated as hereinbefore described is in a state of high activity because such treatment reduces at least a part of the nickel compound to elemental nickel, generally 35 to 40 percent of the nickel being reduced, the reduced nickel content, however, sometimes varying from approximately 10 to 50 percent. The metal hydrogenation catalysts activated according to the invention can be on other supports such as silica gel, alumina, and other known hydrogenation catalyst supports.

As indicated above, the metal hydrogenation catalysts, and particularly nickel-kieselguhr catalysts, are effective for the hydrogenation of aromatic hydrocarbons to saturated hydrocarbons, particularly the conversion of benzene to cyclohexane. Ordinarily, the hydrogenation reaction is carried out at a temperature in the range 200 to 600° F. and at a pressure ranging from 300 to 600 p.s.i.g. As another feature of this invention, the impure hydrogen stream employed for activation of the catalyst can also be utilized as the hydrogen stream during hydrogenation of the aromatic hydrocarbon or other material subsequently hydrogenated with the activated catalyst.

A better understanding of the invention will be obtained upon reference to the accompanying drawing which schematically illustrates the invention.

Referring now in detail to the drawing, the system shown essentially comprises a furnace 10, a reactor 15 containing a bed of a metal catalyst to be reduced, a cooler 20, a separator 25 and a compressor 30.

According to the invention, an impure hydrogen stream containing demethylizable paraffinic hydrocarbons (($C_2$–$C_6$) hydrocarbons) obtained from a reforming operation is introduced into the system by way of valved line 11. The impure hydrogen stream is passed by way of line 12 through furnace 10 wherein the impure hydrogen stream is heated to a temperature above about 500° F. The heated impure hydrogen stream is removed from furnace 10 by way of line 16 and introduced into the top of reactor 15 containing a bed of fresh nickel-kieselguhr hydrogenation catalyst. When the reformer impure stream introduced into reactor 15 contacts the nickel-kieselguhr hydrogenation catalysts at temperatures above about 500° F., rapid demethylization (exothermic) of the ethane and heavier hydrocarbons in the hydrogen stream occurs. This demethylation process, giving off heat, is sufficient to raise the catalyst bed temperature to the desired reduction temperature which is ordinarily of the order of about 650 to about 725° F. The impure hydrogen stream, after contacting the catalyst bed in reactor 15, is removed from a lower portion of the reactor by way of line 18. This stream is comprised primarily of hydrogen and methane. If desired, a portion of the gas stream removed through line 18 can be recovered as fuel gas by way of valved line 22.

The remainder of the reducing gas removed from reactor 15 is passed by way of valved line 19 to cooler 20 wherein the temperature of the gas is reduced to a temperature of about 100° F., and then passed through line 21 and introduced into separator 25. Condensed water is removed from a lower portion of separator 25 by way of line 23, and fuel gas is taken overhead by way of line 24. All of the fuel gas can be removed from the system through valved line 27 if desired. However, if desired, all or a portion of the fuel gas taken overhead from separator 25 can be passed through valved line 26 and combined with fuel gas in line 22 and passed to a subsequent place of utilization. A gas stream comprising hydrogen and methane is removed from separator 25 by line 28, compressed in compressor 30, and then passed through valved line 29 to line 12 wherein it is combined with impure hydrogen introduced into the system through line 11, and thence to furnace 10 as previously described.

If one does not have a reformer residue gas rich in hydrogen, but has a residue gas available from a process wherein light hydrocarbons are cracked, which gas contains very little ethane and heavier hydrocarbons, such a stream can also be used according to the invention. Such a stream would also be introduced by way of valved line 11, passed through conduit 12, heater 10 wherein it is heated to a temperature of about 500° F., and thence through line 16 and introduced into reactor 15 containing a catalyst to be reduced. Since this stream contains very little ethane and heavier hydrocarbons it gives a relatively low temperature rise due to demethylation since only a small amount of demethylation occurs and therefore the reduction reaction can be readily controlled. The reducing gas is removed from reactor 15 through line 18 and passed for further use through valved line 22. When employing such a residue gas as described in this embodiment it can be passed on a once-through basis through the reactor, no steam diluent is needed, and the gas need not be recycled as diluent as previously described in the previously described embodiment.

Still further according to the invention, if one does not have an impure hydrogen stream containing demethylizable hydrocarbons from a processing unit, but has a limited amount of pure hydrogen available and light hydrocarbons, I provide a process wherein an impure hydrogen stream can be formed and utilized as the reducing medium. In such an operation, pure hydrogen is introduced into the system through valved line 13, passed through line 12, heated in furnace 10 to a temperature of about 500° F., passed through line 16 and introduced into reactor 15 containing a catalyst to be reduced. The hydrogen is circulated through reactor 15, conduit 18, and back to conduit 12 and back to reactor 15 until the outlet temperature of reactor 15 reaches a level above the water dew point of the system, i.e., so that water produced in reducing the metal oxide to the metal and water evaporated from the bed will not condense therein, and the temperature of the bed has reached the point where demethylation will take place. When the system has reached this point, hydrocarbon impurities, for example demethylizable materials such as $C_2$ to $C_6$ acyclic hydrocarbon, are introduced into the system in controlled amounts by way of valved line 14. The addition of the demethylizable materials to the circulating stream increase the rate of heating due to the demethylation reaction (exothermic). This stream is circulated until the desired degree of catalyst reduction is accomplished. The heat of the demethylation of the added hydrocarbons is used along with the heat in the circulating hydrogen stream to bring the catalyst bed to the reduction temperature which is about 700° F. The quantity of the demethylatable hydrocarbon used can be controlled to control the rate of heating of the bed.

After the catalyst has been activated with the impure hydrogen stream of the invention as described above, the catalyst is now available for utilization for hydrogenation, e.g., aromatic hydrocarbons. The hydrogenation process for which these catalysts can be used is well known to those skilled in the art and need not be discussed further here.

A more comprehensive understanding of the invention can be obtained by referring to the following illustrative example which is not intended, however, to be unduly limitative of the invention.

SPECIFIC EXAMPLE

An impure hydrogen stream containing demethylizable hydrocarbons obtained as off-gas from a catalytic reformer operation is utilized without steam to activate a fixed bed of fresh nickel-kieselguhr catalyst according to the process flow shown in the drawing. The activation temperature in reactor 15 is maintained between a reduction temperature of about 650° F. to about 725° F. The compositions of the various streams shown in the drawing are set forth in Table I below:

*Table I*

[Invention: No steam and with recycle]

| Component | Line 11 | | Recycle Line 29, S.c.f./Day | Line 16, S.c.f./Day | Line 18, S.c.f./Day | Line 27, S.c.f./Day |
|---|---|---|---|---|---|---|
| | S.c.f./Day | Mol Percent | | | | |
| Hydrogen | 129,603 | 90.0 | 1,230,000 | 1,359,603 | 1,293,500 | 63,500 |
| Methane | 4,900 | 3.4 | 626,000 | 630,900 | 663,500 | 37,500 |
| Ethane | 3,310 | 2.3 | | 3,310 | | |
| Propane | 3,450 | 2.4 | | 3,450 | | |
| Butanes | 1,730 | 1.2 | | 1,730 | | |
| Pentanes | 575 | 0.4 | | 575 | | |
| Hexanes | 432 | 0.3 | | 432 | | |
| Steam (Formed) | | | | | 43,000 | |
| Steam (Evap.) | | | | | 9,500 | |
| Total | 144,000 | 100.0 | 1,856,000 | 2,000,00 | 2,009,500 | 101,000 |

The catalyst activated according to the invention has a catalyst life for the hydrogenation of aromatics, e.g., benzene, of up to about 200 barrels of fresh feed per pound of catalyst.

For comparison, the same hydrogen source is utilized to activate the same catalyst under substantially the same conditions except on a once-through basis and with steam added as diluent. The compositions of streams 11 and 18 (referring to the drawing) are set forth in Table II below:

*Table II*

[Old way: Same H₂ source, no recycle, using steam]

| Component | (Line 11) | | (Line 18), S.c.f./Day |
|---|---|---|---|
| | S.c.f./Day | Mol percent | |
| Hydrogen | 1,800,000 | 35.7 | 1,480,000 |
| Methane | 68,000 | 1.4 | 477,000 |
| Ethane | 46,000 | 0.9 | |
| Propane | 48,000 | 1.0 | |
| Butanes | 24,000 | 0.5 | |
| Pentanes | 8,000 | 0.2 | |
| Hexanes | 6,000 | 0.1 | |
| Steam Diluent | 3,040,000 | 60.2 | 3,040,000 |
| Steam Formed | | | 43,600 |
| Steam Evap | | | 9,500 |
| Total | 5,040,000 | 100.0 | 5,050,100 |

The catalyst activated with steam addition has a catalyst life for benzene hydrogenation of from 9 to 10 barrels of fresh feed per pound of catalyst.

It will be evident to those skilled in art that many variations and modifications can be practiced upon a consideration of the foregoing disclosure. Such variations and modifications are believed to be within the spirit and scope of the present invention.

I claim:

1. A process for the activation of a nickel-kieselguhr catalyst which is in a reducible state in the absence of added steam which comprises heating an impure hydrogen stream containing at least 2 mol percent of demethylizable acyclic hydrocarbon compounds having from 2 to 6 carbon atoms to a temperature of about 500° F., passing said heated stream over a bed of said catalyst to reduce said catalyst and demethylate said hydrocarbon, thereby raising the catalyst bed temperature to a temperature in the range 650 to 725° F., removing said stream comprising hydrogen, methane and moisture from said bed and cooling same, passing said cooled stream to a separation zone wherein condensed moisture is removed and a portion of the non-condensible materials are recovered as fuel gas, and recycling the remainder of said stream along with said impure hydrogen stream to said catalyst bed thereby controlling the quantity of demethylizable components passing over said bed of catalyst to maintain said reducing temperature.

2. A process for the activation of a nickel-kieselguhr catalyst which is in a reducible state with a limited quantity of pure hydrogen and in the absence of added steam which comprises cycling a heated pure hydrogen stream through a bed of said catalyst until the bed effluent temperature is above the water dew point of the system and the effluent is above a demethylation temperature of about 500° F., adding to said hydrogen stream a controlled amount of demethylizable acyclic hydrocarbon compounds having from 2 to 6 carbon atoms so as to increase the rate of heating of said bed due to the demethylation reaction until a reducing temperature in the range 650 to 725° F. is reached, controlling the quantity of demethylizable components added to maintain said reducing temperature, and continuing the cycling until the desired degree of reduction is achieve.

References Cited by the Examiner

UNITED STATES PATENTS

| 2,040,233 | 5/36 | Adkins | 252—459 |
| 2,244,573 | 6/41 | Roberts | 252—459 |
| 2,254,748 | 9/41 | Michael et al. | 252—472 X |
| 2,373,501 | 4/45 | Peterson | 260—667 |
| 2,440,414 | 4/8 | Oblad | 260—667 |
| 2,696,475 | 12/54 | Farrow | 252—466 X |
| 3,098,829 | 7/63 | White et al. | 252—466 |

MAURICE A. BRINDISI, *Primary Examiner.*

JULIUS GREENWALD, *Examiner.*